United States Patent [19]
Giesfeldt

[11] 3,800,054
[45] Mar. 26, 1974

[54] METHOD FOR MAKING POTATO BASKETS

[75] Inventor: John C. Giesfeldt, Milwaukee, Wis.

[73] Assignee: Baskettes Ltd., Milwaukee, Wis.

[22] Filed: May 19, 1971

[21] Appl. No.: 144,747

[52] U.S. Cl.................. 426/390, 426/514, 426/143
[51] Int. Cl............................................... A23l 1/12
[58] Field of Search............ 99/1, 88, 89, 100, 380,
99/381, 382, 383, 428, 442; 249/141, 112,
113; 425/84

[56] References Cited
UNITED STATES PATENTS

| | | | |
|---|---|---|---|
| 2,156,145 | 4/1939 | Cavett...................................... | 99/88 |
| 3,324,137 | 7/1943 | Cunningham........................ | 99/100 |
| 2,691,337 | 10/1954 | Forrest...................................... | 99/1 |
| 2,833,654 | 5/1958 | Sonnenshein......................... | 99/100 |
| 3,290,154 | 12/1966 | Turner..................................... | 99/88 |
| 3,518,091 | 6/1970 | Turner..................................... | 99/88 |
| 3,259,677 | 7/1966 | Zwich.................................. | 249/141 |

Primary Examiner—Wilbur L. Bascomb, Jr.
Assistant Examiner—Martin G. Mullen
Attorney, Agent, or Firm—Thomas F. Kirby

[57] ABSTRACT

A container for making potato baskets or the like comprises an inner shell, an outer shell and a cover member. The inner shell comprises a first conical perforated side wall member, a perforated end wall at the narrow end of the side wall member, and a perforated flange member at the wide end of the side wall member, which flange member extends outwardly therefrom. The outer shell comprises a second conical perforated side wall member of greater length and diameter than the first side wall member and its wide end is adapted to releasably engage the flange member when the two shells are nested together. An opening at the narrow end of the second side wall member is adapted to be closed by a cover member which releasably engages the second side wall member. The first and second side wall members have different angular slopes so that the space enclosed therebetween is wider at the narrower end of the container than at the other end to facilitate the insertion of a raw shredded comestible and to facilitate the removal of the cooked basket.

Several assembled and filled containers can be stacked together and releasably secured by brackets, with the flange member of one container closing off the opening in the narrow end of an adjacent container.

In accordance with the method, a raw shredded comestible is inserted into the space through the opening in the narrow end of an assembled container and packed firmly in place. Then, the cover is put in place (or several containers are stacked together and releasably secured by the brackets) and the filled, closed container is immersed in hot frying liquid until the comestible is cooked. Then, the container is removed from the liquid and the inner and outer shells are separated to release the cooked basket.

13 Claims, 7 Drawing Figures

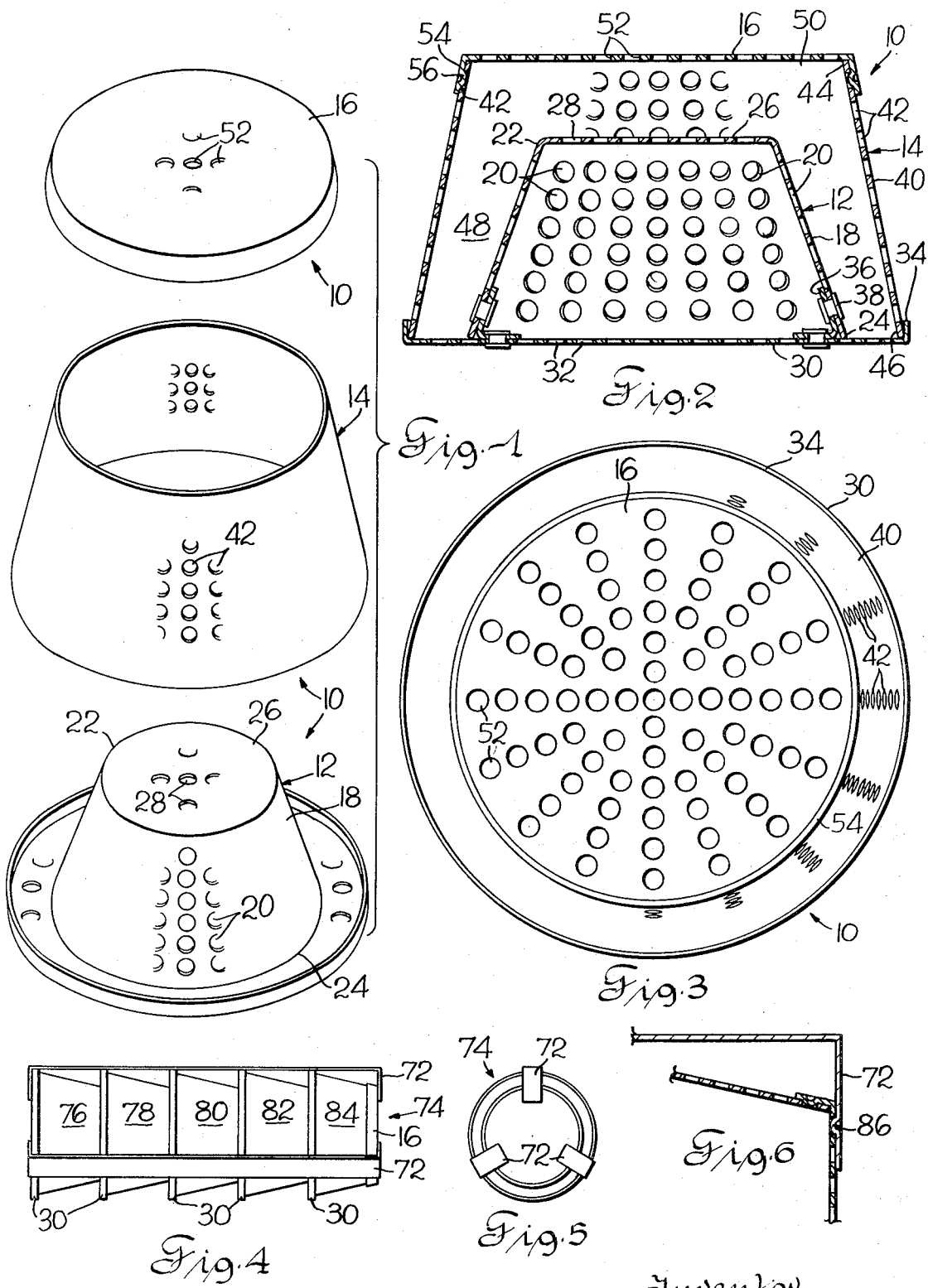

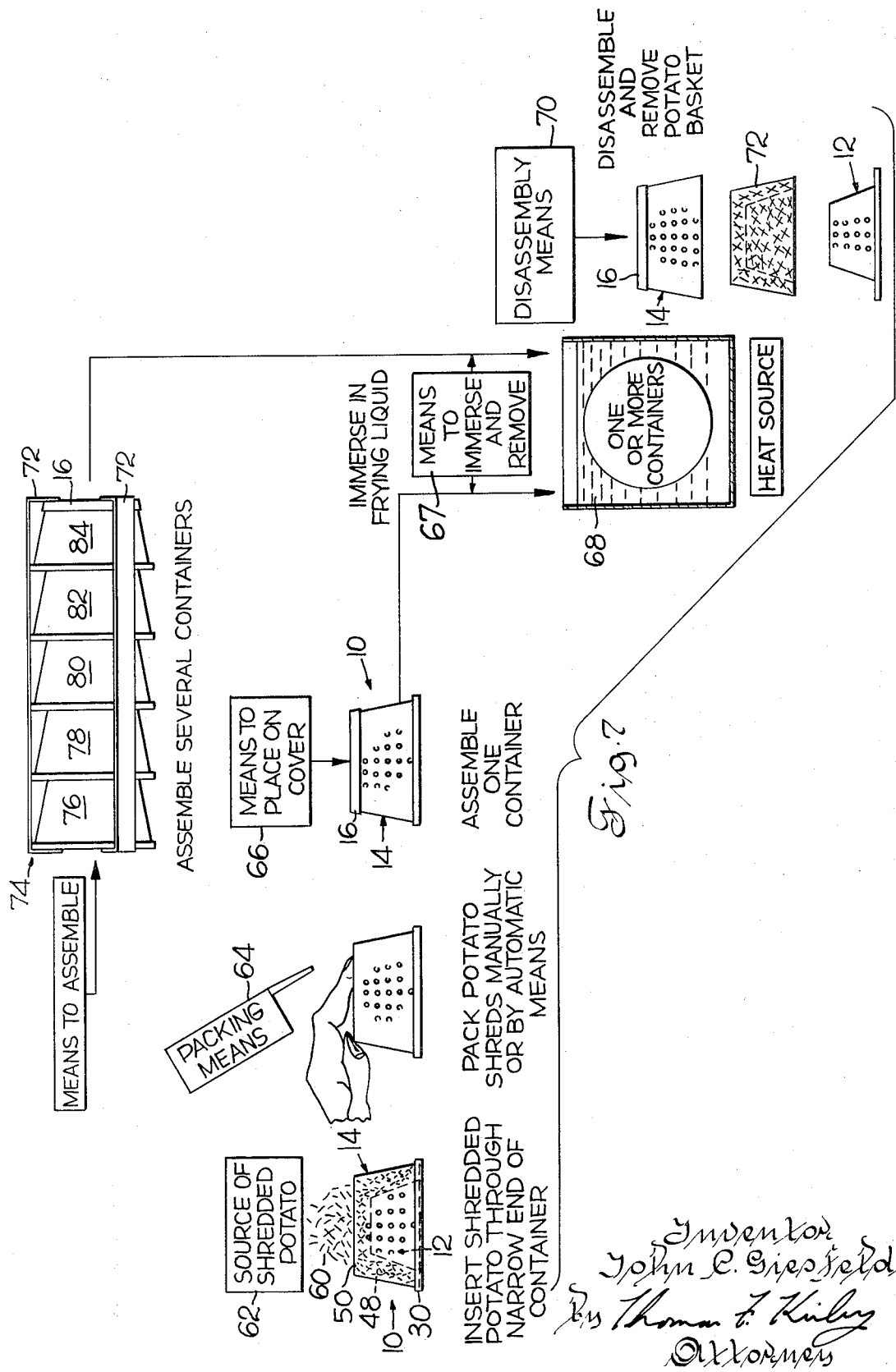

METHOD FOR MAKING POTATO BASKETS

SUMMARY OF THE INVENTION

1. Field of Use of the Invention

This invention relates generally to means and methods for making basket-shaped comestibles, such as potato baskets or the like.

2. Description of the Prior Art

Heretofore, individual so-called "potato baskets" were made by providing a first member similar in shape to an ordinary kitchen sieve, partially filling this first member with a raw, shredded food product manually or mechanically arranged in layer about the inner surface, placing and securing a second smaller sieve-like member inside the first one to shape the potatoes in the form of a basket, immersing the entire unit in hot frying liquid until the potatoes were partially cooked, then removing and disengaging the two sieve-like members to release the partially cooked potato basket, and then continuing to fry the basket until done. Examples of the prior art are shown in U.S. Pat. Nos. 2,156,145 and 2,833,654.

The prior art means and methods, while generally satisfactory for their intended purpose, required considerable time to manually or mechanically arrange the shredded potatoes properly so that the two sieve-like members could be fitted together prior to cooking. Also, in the manual way, skilled personnel were required. Furthermore, the prior art only contemplated the use of individual containers during the cooking process. It is desirable, therefore, to provide improved means and methods for making potato baskets and the like.

In accordance with the present invention, there is provided a container for making potato baskets or the like which comprises an inner shell, an outer shell and cover means. The inner shell comprises a first perforated side wall member having a narrow end and a wide end; a perforated end wall at the narrow end of the first side wall member; and a perforated flange member at the wide end of the first side wall member and extending outwardly therefrom. The outer shell comprises a second perforated side wall member having a narrow end and a wide end. The second side wall member is of greater length and diameter than the first side wall member so that the latter can nest within the former and define a space therebetween. The side wall members have different slopes so that the space therebetween is wider at the narrower ends of the side walls than at the wider ends of the side walls. Means are provided to releasably attach the inner shell to the outer shell.

In accordance with one aspect of the invention, the cover means for closing off the opening in the narrow end of the second side wall member comprises a perforated releasably attachable cover member. In accordance with another aspect of the invention several containers are stacked together and the cover means comprise the outer side of the perforated flange member of an adjancent container.

In accordance with the method of the present invention, the inner shell (comprising the first side wall member and the flange member) and the outer shell (comprising the second side wall member) are secured together. A raw shredded food product is introduced through the opening in the narrow end of the outer shell and manually or mechanically packed in place in the space between the side wall members and against the end wall of the inner shell. Then, the opening is closed by manually or mechanically putting the cover means in place (either by emplacement of the cover member or stacking a plurality of containers together). Then, the filled individual container or stack of several filled containers is immersed in a frying liquid, such as hot oil, until the food is cooked. Finally, the container or stack thereof is removed from the liquid and the inner and outer shells are manually or mechanically separated to free the cooked food basket. Preparatory to reuse, the cover means on individual containers are removed to provide access to the opening in the outer shell.

OBJECTS OF THE INVENTION

It is an object of the present invention to provide improved means and improved methods for making edible basket-shaped food products, such as potato baskets or the like.

Another object is to provide such means and methods which increase the production rate of making such baskets, reduce the cost thereof, provide a more uniform and attractive food product, and provide a less fragile product.

Another object is to provide means and methods of the aforesaid character which permit such baskets to be made by unskilled labor or by mechanized processes.

Another object is to provide improved containers of the aforesaid character which are usable as individual units or in stacked arrangements.

Another object is to provide means of the aforesaid character which are relatively easy and economical to fabricate and use.

Other objects and advantages of the invention will hereinafter appear.

DRAWINGS

The accompanying drawings illustrate several preferred embodiments of the invention but it is to be understood that the embodiments illustrated are susceptible of modifications with respect to details thereof without departing from the scope of the appended claims.

In the drawings:

FIG. 1 is an exploded view of a container for making potato baskets in accordance with the invention;

FIG. 2 is a cross-section view of the assembled container shown in FIG. 1;

FIG. 3 is a top plan view of the assembled container shown in FIG. 2;

FIG. 4 is a side elevational view showing a plurality of containers stacked together and secured by brackets;

FIG. 5 is an end elevational view of the stack of containers shown in FIG. 4;

FIG. 6 is an enlarged cross-section view showing the means whereby the brackets shown in FIGS. 4 and 5 are secured to an end container; and FIG. 7 is a diagrammatic showing of a flow chart of methods in accordance with the present invention.

DETAILED DESCRIPTION OF THE EMBODIMENTS

Referring to FIGS. 1, 2 and 3 of the drawings, the numeral 10 designates a container for making potato baskets or the like in accordance with the present invention. Container 10 comprises an inner shell 12, an outer shell 14, and cover means which, in FIGS. 1, 2 and 3, comprise a cover member 16.

Inner shell 12 comprises a first side wall member 18 which is provided with a plurality of perforations 20 and has a narrow end 22 and a wide end 24. Preferably, member 18 is frustoconical or takes the form of a truncated cone, although other shapes with sloped sides could be employed. Inner shell 12 also comprises an end wall 26 at the narrow end 22 of member 18 and the end wall is provided with a plurality of perforations 28. Inner shell 12 further comprises a flange member 30 at the wide end 24 of member 18 and the flange member is provided with a plurality of perforations 32. Flange member 30 extends outwardly beyond the periphery of member 18 and is provided with an annular lip 34. As FIG. 2 best shows, member 18 is rigidly secured to flange member 30 by brackets 36 and rivets 38.

Outer shell 14 comprises a second side wall member 40 which is provided with a plurality of perforations 42 and has a narrow end 44 and a wide end 46. Preferably, member 40 is a frustoconical or takes the form of a truncated cone, although other shapes with sloped sides could be employed. Member 40 is of greater length and greater diameter than member 18 which is adapted to nest therewithin to define a space 48. Members 40 and 18 have different slopes, as FIG. 2 best shows, so that space 48 is wider near narrow end 44 of member 40 than it is near wide end 46 of member 40.

First means are provided for releasably connecting inner shell 12 and outer shell 14 and such means take the form of lip 34 on flange member 30 which frictionally engages the periphery of wide end 46 of member 40.

Cover member 16 for closing an opening 50 at the narrow end 44 of member 40 is provided with a plurality of perforations 52. When cover member 16 is in place, a portion of space 48 exists between cover member 16 and end wall 26 of inner shell 12. Preferably, this portion is about as deep as the widest region of space 48 between the wall members 40 and 18.

Second means are provided for releasably connecting cover 16 to member 40 and such means take the form of lip 54 on cover 16 and, preferably, lip 54 is provided with at least one indentation 56, shown in FIG. 2, which engages a perforation 42 in member 40.

The embodiment of the invention shown in FIGS. 1, 2 and 3 is utilized as follows, as shown in FIG. 7 of the drawings. Inner shell 12 and outer shell 14 are assembled and raw shredded potato 60 from a source 62 is inserted into space 48 through upwardly disposed opening 50. Because space 48 is wider near opening 50 than near the bottom of container 10, the shredded potato 60 is easily inserted and easily packed or tamped into a firm mass, either manually or by mechanical packing or tamping means 64, such as a reciprocating device, shown in FIG. 7. After tamping, cover member 16 is put in place on outer shell 14 either manually or by mechanical means 66, shown in FIG. 7. Then, closed container 10 is immersed in hot frying liquid 68 until the potato is cooked. The perforations in all component parts of container 10 are of such number and size so as to permit free flow of hot liquid to all portions of the potato shreds therein. After cooking, container 10 is removed from liquid 68, either manually or by mechanical means 67. Then, outer shell 14 and inner shell 12 are separated, either manually or by mechanical means 70, to release the finished potato basket 72. Prior to reuse of container 10, cover 16 is removed from outer shell 14 and the latter is again attached to inner shell 12.

FIGS. 4, 5 and 6 of the drawings illustrate another aspect of the present invention wherein a plurality of containers, such as container 10 hereinbefore described, are filled and placed end-to-end in stacked relationship and are releasably secured by means such as one or more bracket members 72 to provide a composite unit 74. In FIG. 4, five containers designated 76, 78, 80, 82 and 84 are shown. It is to be noted that only end container 84 is provided with a cover 16, hereinbefore described. The cover means for the other four containers are provided by the outer sides of the flange members 30 of adjacent containers. As FIG. 6 shows, each bracket member 72 is provided at its opposite ends with one or more projections, such as projection 86, which engage perforations in the containers at the extreme ends of the stack. It is to be understood that in container 76 the perforations so used are in flange member 30 and in container 84 are in cover 16.

The embodiment of the invention shown in FIGS. 4, 5 and 6 is utilized as follows, as shown in FIG. 7 of the drawings. Each container 76, 78, 80, 82 and 84 is assembled by connecting its members 30 and 40 and is filled with shredded potato and tamped, as hereinbefore explained. Then, the containers are stacked end-to-end and end container 84 is provided with a cover 16. Then, bracket members 72 are put in place to hold the stack together. Composite unit 74 is then immersed either manually or by suitable mechanical conveying means in the frying liquid 68 until the potato baskets are cooked, usually about 5 minutes. Finally, unit 74 is removed from the liquid, either manually or by suitable mechanical conveying means, disassembled, and the potato baskets removed.

It is to be noted that the configuration of space 48 is such that filling of the containers with raw shredded potato is facilitated and removal of the cooked product is also quite easy with little or no damage to the finished product resulting. Also, the finished potato basket itself is mechanically stronger than known types and is more impervious to liquids served therein.

In the embodiments of the invention disclosed herein the perforations in the various members are shown as circular. However, it is to be understood that the perforations could have other shapes, they are sufficiently large and sufficiently numerous to permit free flow of cooking liquid to all surfaces of the potato basket during cooking. Furthermore, the perforations should be so dimensioned with respect to the size of the potato shreds so that there is no tendency for the shreds to wedge or catch in the perforations. In an actual embodiment, for example, where potato shreds measuring one-eighth inch to three-sixteenths inch on a side were used, it was found desirable to use circular perforations 5/32 inch in diameter and the potato shreds did not catch in the perforations or block liquid flow when packed in place.

I claim:

1. A method for making potato baskets from elongated shreds of raw potato comprising the steps of: providing an assembled container having a perforated frusto conical inner shell releasably nested within a perforated conical outer shell, said outer shell having an upwardly disposed opening at its narrow end and cooperating with said inner shell to provide a space therebetween which is wider near said opening than at the opposite end of said container, inserting a mass of shredded raw potato through said opening into said space, packing said mass of shredded raw potato firmly into said space and against said inner and outer shells, closing said opening with releasably attachable perforated cover means, immersing said assembled and closed container in a cooking liquid and cooking said mass of shredded raw potato and then removing said container from said liquid, and disassembling said container by separating said inner and outer shells to release the cooked mass of shredded potato.

2. A method according to claim 1 wherein the step of packing said mass of shredded raw potato firmly in said container is done manually.

3. A method according to claim 1 wherein the step of packing said mass of shredded raw potato is done by reciprocating mechanical means which pack said mass of shredded raw potato into a firm mass.

4. A method according to claim 1 wherein the step of closing said opening is done by manually attaching said releasable perforated.

5. A method according to claim 1 wherein the step of closing said opening is done by mechanical means which attach said releasable perforated means.

6. A method according to claim 1 wherein the steps of immersion and removal from the liquid are done manually by manipulating said closed container.

7. A method according to claim 1 wherein the steps of immersion and removal from the liquid are done by mechanical means, including a conveyor to which said closed container is attached.

8. A method according to claim 1 wherein the step of disassembling said container is done manually.

9. A method according to claim 1 wherein the step of disassembling said container is done by mechanical means which effect separation of said inner and outer shells.

10. A method according to claim 1 including the steps of providing a plurality of assembled containers, closing the opening of at least one container with a releasably attachable perforated cover member, closing the opening of the other containers by stacking another container thereagainst, and securing the plurality of containers together in a stack with said one container being located at one end of said stack.

11. A method according to claim 1 wherein the step of packing said mass of shredded raw potato comprises the step of reciprocating said container.

12. A method of making an edible basket-shaped cooked comestible from elongated shreds of raw potato comprising the steps of:

releasably nesting a perforated inner shell in the form of a truncated cone and having an upwardly disposed end wall within a perforated outer shell in the form of a truncated cone and having a top opening therein to provide a perforated container having an annular space in the form of an inverted basket defined by said shells, with said annular space being wider near said opening than in the region remote therefrom;

inserting a mass of shredded raw potato through said top opening into said space;

closing said top opening after said space is filled;

immersing said container while filled and with said top opening closed into a cooking liquid to cook said mass of raw potato;

and releasing said inner and outer shells from nested relationship to release the edible basket-shaped cooked mass of potato.

13. A method according to claim 12 including the step of packing said mass of shredded raw potato into said space and against said inner shell by reciprocating said container.

* * * * *